United States Patent Office 3,812,066
Patented May 21, 1974

3,812,066
SMOKE SUPPRESSANTS FOR COPOLYMERS OF ETHYLENE AND CHLOROTRIFLUORO-ETHYLENE
Herman Stone, Convent, Arthur B. Robertson, Succasunna, and Marvin T. Tetenbaum, Convent, N.J., assignors to Allied Chemical Corporation, New York, N.Y.
No Drawing. Filed June 23, 1971, Ser. No. 156,055
Int. Cl. C08f 19/14, 21/04
U.S. Cl. 260—23 XA
4 Claims

ABSTRACT OF THE DISCLOSURE

Certain metal-containing organic compounds can be added to ethylene-chlorotrifluoroethylene copolymers to reduce the amount of smoke emitted by the polymer upon exposure to a flame.

This invention relates to smoke suppressants for polymers. More particularly, this invention relates to smoke suppressants for ethylene-chlorotrifluoroethylene copolymers.

BACKGROUND OF THE INVENTION

Copolymers of ethylene and chlorotrifluoroethylene, particularly copolymers containing about equimolar amounts of the monomers, exhibit highly desirable properties including outstanding resistance to solvents, both organic solvents and inorganic acids and bases. They have high tensile strength, high melting points and excellent electrical properties. When stabilized they are readily melt processable by conventional extrusion and injection molding techniques to form useful articles. These polymers are also flame resistant. However, when contacted with a developed flame, they decompose, emitting a moderate amount of smoke.

The present application describes a method of reducing the smoke emitted when ethylene-chlorotrifluoroethylene copolymers are contacted with a flame.

SUMMARY OF THE INVENTION

It has been discovered that the addition of small amounts of certain metal-containing organic compounds to copolymers of ethylene and chlorotrifluoroethylene decreases the amount of smoke emitted by the polymer upon contact with a flame.

DETAILED DESCRIPTION OF THE INVENTION

The addition of from about 0.1–10% by weight of the copolymer of certain metal-containing organic compounds to copolymers of ethylene and chlorotrifluoroethylene is effective to reduce the smoke emitted upon contact with a flame.

The metal-containing organic compounds found suitable in the invention include tin salts of carboxylic acids of from 1 to 30 carbon atoms, such as stannous oleate, stannous octoate, stannous maleate and the like; metal chelates of enol ethers such as chromium acetylacetonate, nickel acetylacetonate, copper acetylacetonate, copper benzoylacetonate, cerium benzoylacetonate and the like; and metal salts of tetrasubstituted benzoquinones of the formula:

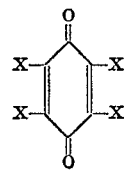

wherein X independently at each occurrence is chlorine, bromine and hydroxy, such as nickel 2,5-dichloro-3,6-dihydroxybenzoquinone, barium tetrahydroxybenzoquinone, zinc 3,5-dibromo-3,6-dihydroxybenzoquinone, calcium tetrachlorobenzoquinone, cobalt tetrabromobenzoquinone and the like.

Copolymers of ethylene and chlorotrifluoroethylene are well known and can be prepared by various known processes. For example, U.S. Pat. 2,392,378 discloses copolymerization of ethylene with chlorotrifluoroethylene in a stirred aqueous medium at elevated pressures using benzoyl peroxide as catalyst; a process whereby 1:1 alternating copolymers are prepared using a radiation catalyst at 0° C. is disclosed in Nucleonics, September 1964, pages 72–74; British Pat. 949,422 discloses a bulk copolymerization at temperatures at from −80 to 50° C. using an oxygen-activated alkyl boron catalyst, and U.S. Pats. 3,371,076 and 3,501,446 which also employ oxygen-activated boron-containing catalysts. The copolymers can also be prepared by bulk polymerization at temperatures of about 0° C., ±10° C., at pressures of from 75 to 150 p.s.i.g. using organic peroxide-type initiators, such as trichloroacetyl peroxide and adding about 0.5 to 2% by weight of a chain transfer agent, such as chloroform or heptane. The copolymers particularly preferred have a melt index of from 0.5 to 5, contain 40 to 55 mol percent of ethylene and have a melting point over 240° C. The copolymers generally contain one or more stabilizers as will be known to one skilled in the art.

The invention will be further illustrated by the following Examples, but it is to be understood that the invention is not meant to be limited to the details described therein. In the Examples, smoke density rating and total smoke, expressed as loss of light transmission, were determined according to the procedures given in ASTM test D2843–70.

EXAMPLE 1

A 1:1 ethylene-chlorotrifluoroethylene copolymer having a melt index of 0.5, stabilized with 0.15% by weight of the copolymer of distearylthiodipropionate and 0.3% of a phosphate of a sterically hindered phenol was melt blended with 1% by weight of the copolymer of various metal-containing organic compounds in an extruder and tested for smoke emission. Results are summarized below:

TABLE

| Additive | Smoke density | Maximum smoke |
|---|---|---|
| None (control) | 57 | 73 |
| Chromium acetylacetonate | 41.6 | 52 |
| Stannous oleate | 30.8 | 38 |
| Nickel 2,5-dichloro-3,6-dihydroxybenzoquinone | 52 | 62 |

We claim:
1. A composition comprising a copolymer of ethylene and chlorotrifluoroethylene having a melt index of 0.5 to 5, a melting point over 240° C. and containing 40 to 55 mol percent of ethylene and from about 0.1 to 10 percent by weight of the copolymer of a smok suppressant comprising a tin salt of a carboxylic acid having from 1 to 30 carbon atoms.
2. A composition according to claim 1 wherein the smoke suppressant is stannous oleate.
3. A composition comprising a copolymer of ethylene and chlorotrifluoroethylene and from about 0.1 to 10 percent by weight of the copolymer of a smoke suppressant comprising a tin salt of a carboxylic acid having from 1 to 30 carbon atoms.

4. A composition according to claim 3 wherein the smoke suppressant is stannous oleate.

References Cited
UNITED STATES PATENTS

| | | | |
|---|---|---|---|
| 3,501,446 | 3/1970 | Ragazzini | 260—87.5 B |
| 3,371,076 | 2/1968 | Ragazzini | 260—87.5 B |
| 3,418,263 | 12/1968 | Hindersinn | 260—45.75 K |
| 3,245,926 | 4/1966 | Parker | 260—23 XA |
| 3,637,542 | 1/1972 | Doerge et al. | 260—25 AJ |
| 3,647,724 | 3/1972 | Doerge et al. | 260—2.5 AJ |

OTHER REFERENCES
"Polythene," Renfrew, 1957, pp. 43 to 50 relied on.

DONALD E. CZAJA, Primary Examiner

W. E. PARKER, Assistant Examiner

U.S. Cl. X.R.

260—45.7 R, 45.75 K, 45.85 K, 45.95 R